(12) United States Patent
Shigematsu et al.

(10) Patent No.: US 6,225,583 B1
(45) Date of Patent: May 1, 2001

(54) PRESSURE SENSITIVE SENSOR UTILIZING MATERIALS OF DIFFERENT SOLUBILITY PARAMETERS AND METHOD FOR MANUFACTURING THE SAME

(75) Inventors: Satoshi Shigematsu, Kanagawa-ken; Takeomi Takamiya; Kenichi Ikuta, both of Chiba-ken, all of (JP)

(73) Assignees: Nissan Motor Co., Ltd., Kanagawa-ken (JP); Kinugawa Rubber Industrial Co., Ltd., Chiba-ken (JP)

( * ) Notice: Subject to any disclaimer, the term of this patent is extended or adjusted under 35 U.S.C. 154(b) by 0 days.

(21) Appl. No.: 09/375,501

(22) Filed: Aug. 17, 1999

(30) Foreign Application Priority Data

Sep. 9, 1998 (JP) .................................................. 10-255611

(51) Int. Cl.7 ..................................................... H01H 3/16
(52) U.S. Cl. ......................................................... 200/61.44
(58) Field of Search ...................... 318/256, 257, 318/264–268, 280, 283, 286, 434, 466, 468, 469; 49/26–28; 73/706, 756, 714; 340/426, 429, 541, 565, 665; 200/61.41–61.44

(56) References Cited

U.S. PATENT DOCUMENTS

| | | | |
|---|---|---|---|
| 4,773,183 | * | 9/1988 | Okushima et al. ..................... 49/28 |
| 4,970,446 | * | 11/1990 | Yaguchi ................................. 318/280 |
| 5,166,586 | * | 11/1992 | Yaguchi ................................. 318/434 |
| 5,616,997 | * | 4/1997 | Jackson et al. ....................... 318/467 |
| 5,712,620 | * | 1/1998 | Greenwood .......................... 340/541 |
| 5,754,017 | * | 5/1998 | Tsuge et al. .......................... 318/286 |
| 5,880,421 | * | 3/1999 | Tsuge et al. ....................... 200/61.44 |

FOREIGN PATENT DOCUMENTS

9-209615    8/1997    (JP) .

* cited by examiner

Primary Examiner—William Oen
(74) Attorney, Agent, or Firm—McDermott, Will & Emery

(57) ABSTRACT

A pressure sensitive sensor of the present invention disclosed includes a hollow base body made by use of a rubber and having a hollow portion, a pair of electrically conductive bodies, at least one of which is made by use of a conductive rubber, disposed so as to be opposed to each other at a required spacing, and a plasticizer blocking portion which is provided between the hollow base body and the pair of electrically conductive bodies and which prevents plasticizer in the hollow base body from immigrating to the pair of electrically conductive bodies.

14 Claims, 4 Drawing Sheets

PRESSURE SENSITIVE SENSOR UTILIZING MATERIALS OF DIFFERENT SOLUBILITY PARAMETERS AND METHOD FOR MANUFACTURING THE SAME

BACKGROUND OF THE INVENTION

The present invention relates to a pressure sensitive sensor and a method for manufacturing the same, and more particularly to a pressure sensitive sensor used for a mechanism provided to a power window of an automobile or a residential shutter so as to prevent a foreign matter from being caught in, or used for sensing a collision of a resilient bumper of a transportation cp Japanese Patent Application Laid-Open 9-209615 discloses a mechanism for preventing a foreign matter from being caught in.

SUMMARY OF THE INVENTION

According to studies of the present inventors, as a mechanism for preventing a foreign matter from being caught in a power window of an automobile, there is given a pressure sensitive sensor structured such that a pair of conductive bodies comprising conductive rubbers are disposed integrally to a tube body (glass run) made of a rubber material fixed on an inner peripheral edge of a window frame and are disposed to be spaced slightly from each other in an opposing manner in a hollow portion of the glass run, and the conductive rubbers are brought into contact with each other to be made conductive to each other due to external force that acts on the glass run in a direction of compression thereof, so that a detection signal is output. Such a pressure sensitive sensor stops a motor for ascending/descending a window glass when detecting a foreign matter.

However, in a case that the pressure sensitive sensor is configured by providing the conductive rubbers integrally in the glass run made of a rubber material, when the electrical resistance value of the conductive rubber is increased due to aging, there may be a possibility that the detection sensitivity of the pressure sensitive sensor is affected.

Particularly, it is assumed that EPDM (Ethylene Propylene Terpolymer) is used as a rubber material of an ethylene-propylene copolymer for the glass run which structures a hollow base body for the pressure sensitive sensor, as it has an excellent slide-guiding performance for the window glass because of a low friction coefficient as well as a high weather resistance and a resiliency, while it is assumed that a material prepared by mixing carbon particles into a silicone rubber, as a main material, having an excellent insulation is used as the conductive rubber. Paraffin oil and naphthenic oil, which are plasticizers of the EPDM, have a solubility parameter (SP value) of about 7 to 8, while the silicone rubber having SP value of 7.3. That is, the SP value of the plasticizer of the rubber material constituting the hollow base body for the pressure sensitive sensor is approximately equal to that of the conductive rubber. Thus, when both the SP values are approximately equal to each other, there is a possibility that the plasticizer contained in the rubber material constituting the hollow base body for the pressure sensitive sensor bleeds to be moved in the conductive rubber due to heat of the atmosphere, and the conductive rubber swells to increase distances between the carbon particles, which results in conductivity failure. This is considered to possibly cause change in sensitivity of the pressure sensitive sensor.

The present invention has been attained in view of the above studies, and is to provide a pressure sensitive sensor which can maintain an excellent detection sensitivity for a long time without change in its electrical resistance value due to the heat of the atmosphere, and a method for manufacturing the same.

A pressure sensitive sensor according to the present invention comprises: a hollow base body made by use of a rubber material and having a hollow portion; a pair of electrically conductive bodies, at least one of which is made by use of an electrically conductive rubber material, disposed so as to be opposed to each other with a predetermined distance in the hollow portion of the hollow base body; and a plasticizer blocking layer which is provided between the hollow base body and the pair of electrically conductive bodies and which is made by use of a resin material having a different solubility parameter from that of a plasticizer in the hollow base body. Here, the pressure sensitive sensor becomes electrically conductive when the pair of the electrically conductive bodies come in contact with each other.

In other words, the pressure sensitive sensor in accordance with the present invention comprising: a hollow base body made by use of a rubber material and having a hollow portion; a pair of electrically conductive bodies, at least one of which is made by use of an electrically conductive rubber material, disposed so as to be opposed to each other with a predetermined distance in the hollow portion of the hollow base body; and a plasticizer blocking means disposed between the hollow base body and the pair of electrically conductive bodies, for blocking a plasticizer in the hollow base body from immigrating to the pair of electrically conductive bodies.

On the other hand, a method for manufacturing of a pressure sensitive sensor in accordance with the present invention comprises the steps of: preparing a hollow base body made by use of a rubber material and having a hollow portion; disposing a pair of electrically conductive bodies, at least one of which is made by use of a conductive rubber material, so as to be opposed to each other with a predetermined distance in the hollow portion of the hollow base body; and providing a plasticizer blocking layer, made by use of a resin material having a different solubility parameter from that of a plasticizer in the hollow base body, between the hollow base body and the pair of electrically conductive bodies.

DETAILED DESCRIPTION OF THE PREFERRED EMBODIMENT

An embodiment of the present invention will herein be explained in detail with reference to the drawings as required.

In the embodiment of the present invention, an example will be explained where a pressure sensitive sensor in accordance with the present invention is applied to a foreign matter catching-in preventing mechanism in a power window of a rear side door for an automobile.

Figure 1:
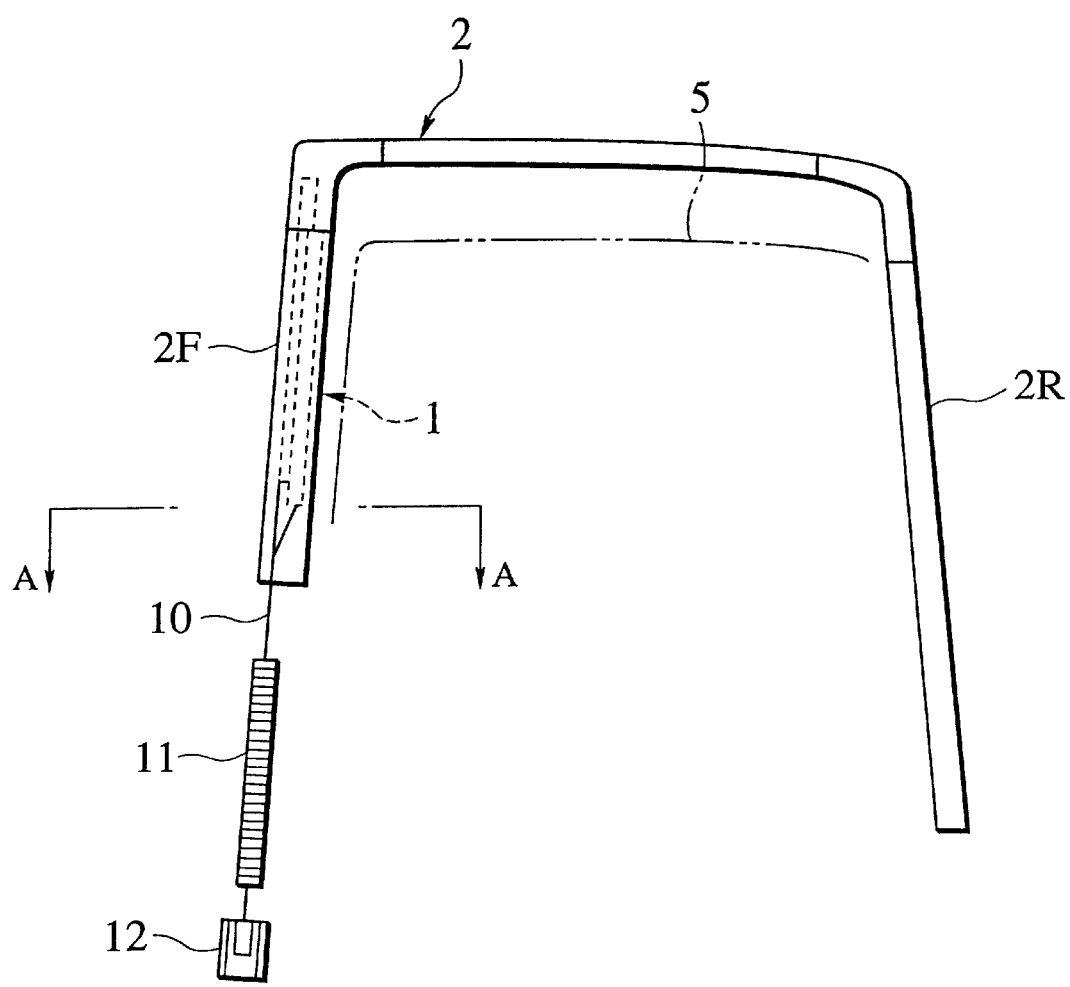
FIG. 1 is a side view illustrating a structure where a pressure sensitive sensor of an embodiment according to the present invention is applied to a foreign matter catching-in preventing mechanism in a power window of a rear side door for an automobile.
Figure 2:
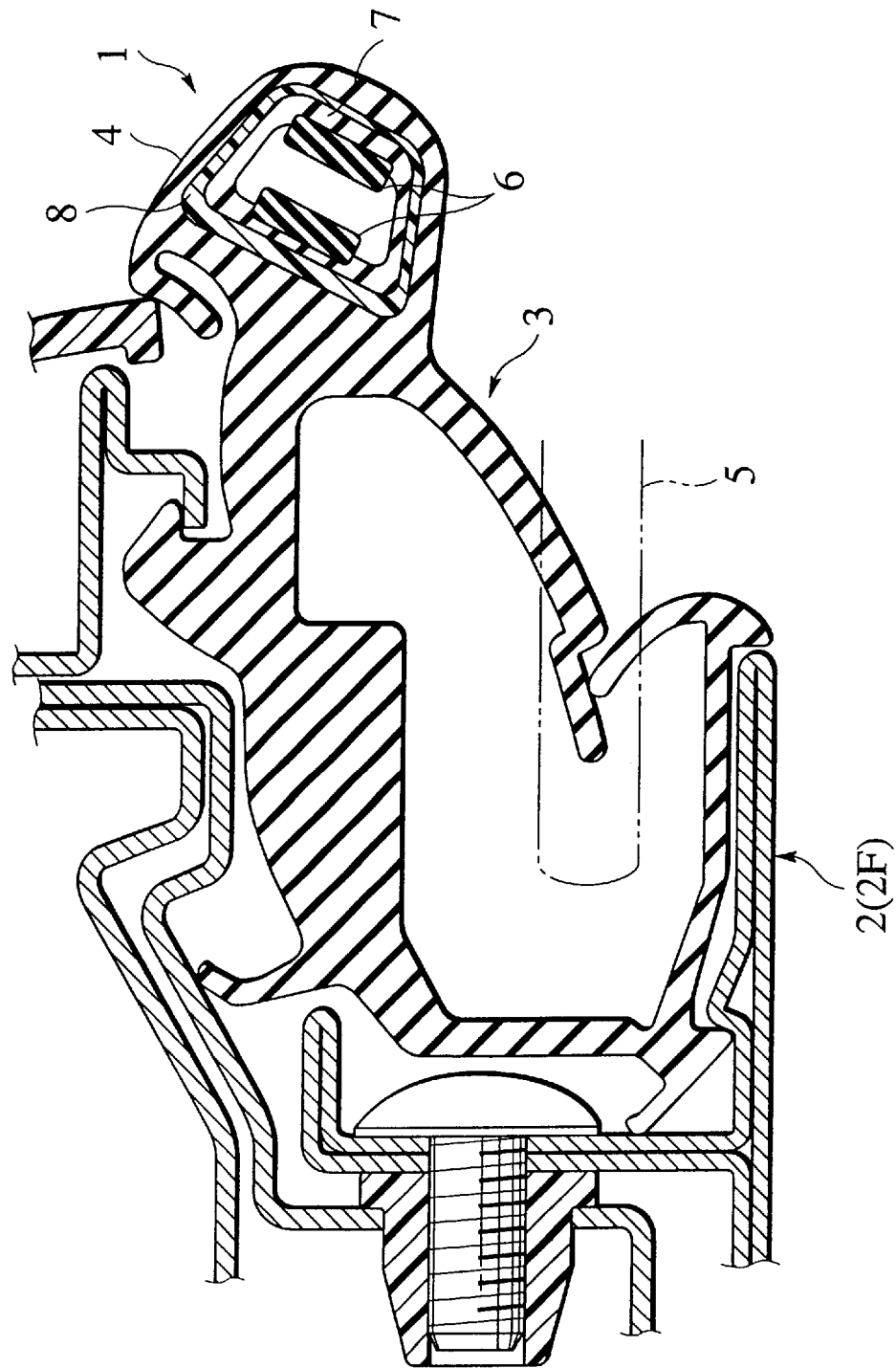
FIG. 2 is a cross-sectional view taken along line A—A in FIG. 1.
Figure 3:
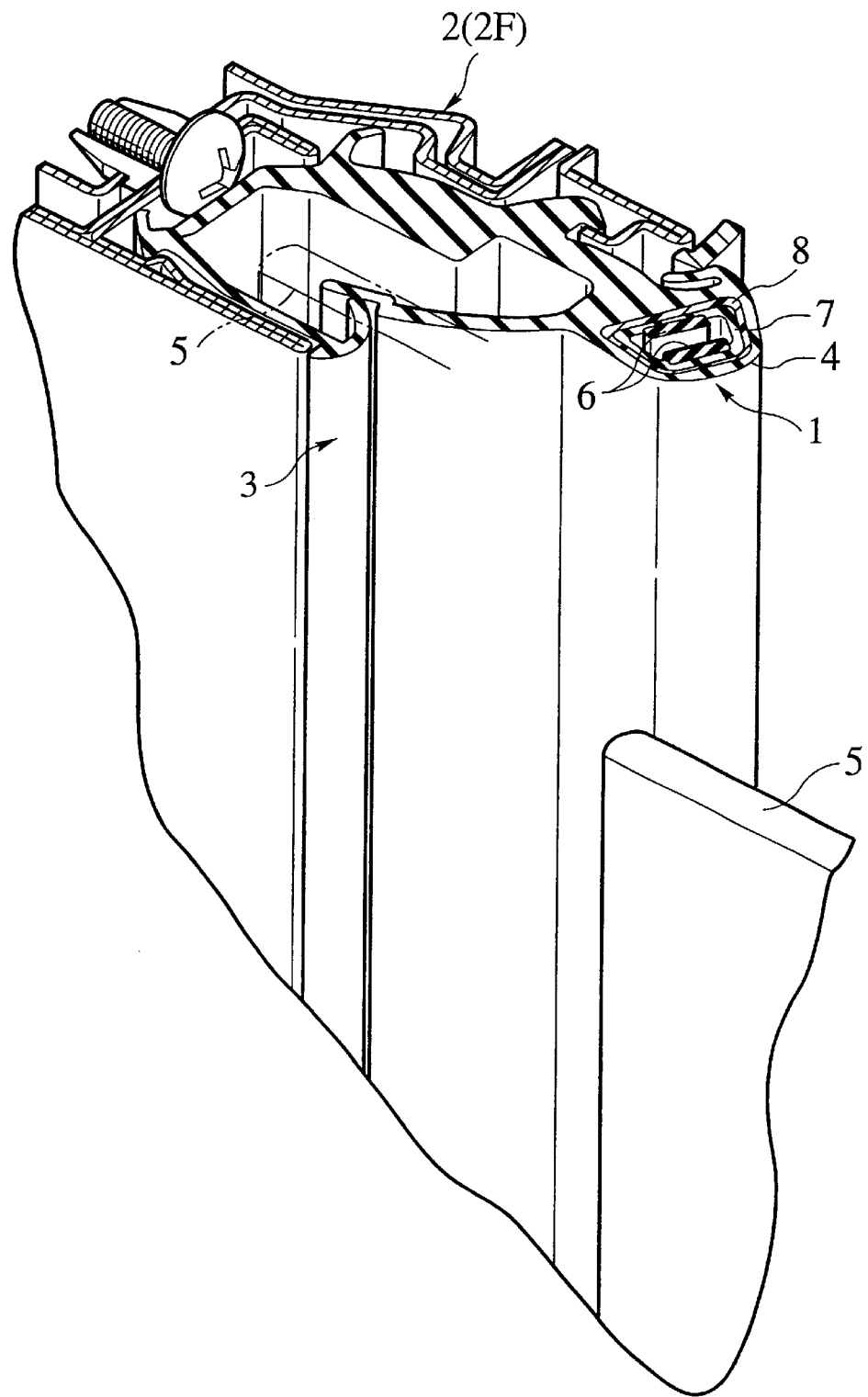
FIG. 3 is a perspective view corresponding to FIG. 2.

As understood with reference to FIGS. 1, 2 and 3, a pressure sensitive sensor 1 is mounted to a glass run 3 on a front side 2F of a door sash 2 in a rear side door of an automobile.

Particularly, the glass run 3 is fitted and fixed in an inner peripheral portion of the door sash 2 of the rear side door and it has both ascension/descension guiding and sealing functions for a door window glass 5 which is ascended/descended by a driving motor (not shown) in a vertical direction shown in FIG. 1. Such a glass run 3 is formed of EPDM as an ethylene-propylene copolymer, taking into consideration that EPDM has excellent weather resistance and resiliency as well as an excellent slide movement guiding property created by its lower friction coefficient for the door window glass 5.

The door window glass 5 is guided in the glass run 3 along the slope of a rear edge 2R of the door sash 2 when it is ascended/descended.

In the embodiment of the present invention, it is assumed that, when the door window glass 5 is closed or ascended at a time of ascending/descending thereof along the rear edge 2R of the door sash 2, a foreign matter is caught in between the front edge portion of the door window glass 5 and the front edge 2F of the door sash 2.

When the foreign matter is caught in between the front edge portion of the door window glass 5 and the front edge 2F of the door sash 2, the driving motor is stopped on the basis of the detection result of the pressure sensitive sensor 1 disposed at the front edge 2F of the glass run 3.

In FIG. 1, reference numeral 10 designates a harness provided on the side of the pressure sensitive sensor 1, reference numeral 11 for a harness protector, and reference numeral 12 for a harness connector disposed at an end of the sensor-side harness 10 on the opposite side to the pressure sensitive sensor 1. The harness connector connects the sensor-side harness 10 to a harness (not shown) located on the side of the rear side door. A signal carrying detection information of the pressure sensitive sensor 1 is transmitted to a controller (not shown) via such a harness or the like and the controller then controls the driving motor as required.

As understood with reference to FIGS. 2 and 3, the glass run 3 disposed on the front edge 2F of the door sash 2 includes a hollow lip 4 integrally formed at the inner peripheral edge thereof on a cabin side of the window glass 5. The hollow lip 4 contains a pair of electrically conductive rubbers 6, 6 as electrically conductive bodies disposed so as to be spaced from each other at a required spacing in an opposing manner. The hollow lip 4 and the pair of the electrically conductive rubbers 6,6 are elements of the pressure sensitive sensor 1. The hollow lip 4 of the glass run 3 corresponds to a hollow base body of the pressure sensitive sensor 1, which is hereinafter referred to as a hollow base body 4.

The pair of electrically conductive rubbers 6,6 are connected with the harness located on the side on the pressure sensitive sensor 1, and they are put in an electrically conductive state when they come in contact with each other, while they are put in a non-conductive state when spaced from each other. Such electrically conductive rubbers 6,6 are prepared by mixing carbon particles in a silicone rubber material having an excellent electrical insulation which is a main rubber material. More specifically, after the electrically conductive rubbers 6,6 are integrally and simultaneously formed by extrusion molding together with and in a silicone rubber-made hollow holder member 7, they are inserted into a hollow portion of the hollow base body 4 by using the holder member 7.

In this embodiment, the plasticizer such as paraffin oil or naphtenic oil blended in EPDM used for the hollow base body 4 has a solubility parameter (SP value) in a range of 7 to 8. On the other hand, each of the holder member 7 and the electrically conductive rubber 6 has a SP value of 7.3, which is approximately equivalent to that of the hollow base body 4.

For this reason, in this embodiment, a plasticizer blocking layer 8 made of a resin material having a different SP value from that of the plasticizer substantially defining the SP value of the hollow base body 4 is disposed between the hollow base body 4 and the holder member 7.

Polytetraphloroethlene (SP value 6.2) is preferably used, for such a plasticizer blocking layer 8, as a material having a lower SP value than that of the plasticizer in the hollow base body 4, and polystylene (SP value 8.6 to 9.7), vinylidene chloride (SP value 9.8), polyvinyl chloride (SP value 9.5 to 9.7), polyuletane (SP value 9.8 to 10.3), or ployester (SP value 10.7) is preferably used as a material having a higher SP value than that of the plasticizer in the hollow base body 4. Of course, appropriate selection is performed on these materials in such a manner that only one of them is used or the combined ones of them are used, in order to achieve a required SP value or the like as needed.

Figure 4:
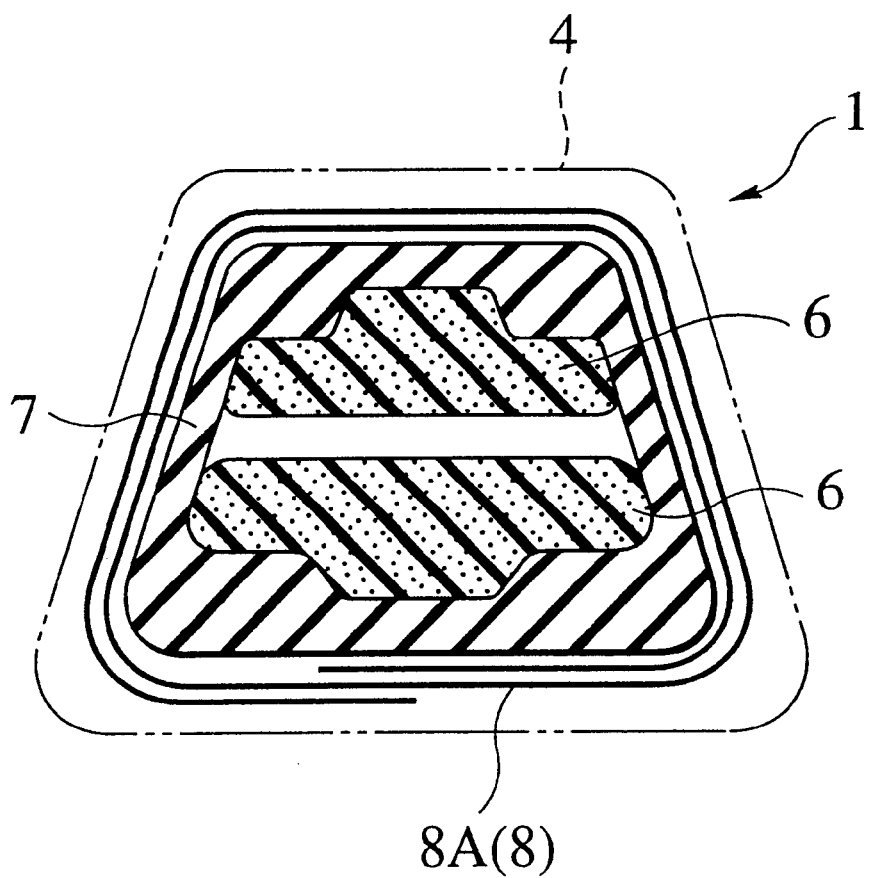
FIG. 4 is a cross-sectional view illustrating a main structure of the pressure sensitive sensor of the embodiment of the present invention.

In this embodiment, as seen in FIG. 4 showing the typical structure of the pressure sensitive sensor 1, the plasticizer blocking layer 8 is configured by winding a resin film 8A made of the material selected from the above described materials in the multi-layers fashion on an outer peripheral surface of the holder member 7.

Besides, in a case that a heat-shrinking material is used for the resin film 8A, there is a possibility that, when the heat-shrinking material is wound on the outer peripheral surface of the holder member 7 as it is, it shrinks by an amount of about 20 to 25% after a thermal load is applied, and the holder member 7 is simultaneously compressed, thereby resulting in increase in its spring constant or in damage of the resin film 8A, more specifically resulting in increase in electrical resistance of each of the electrically conductive rubbers 6,6. In view of such a circumstance, in this case, the heat-shrinking material is applied with an annealing treatment (heat-shrinking process).

Also, it is preferable that a resin material having a smaller friction coefficient than that of the holder member 7 is used as the resin film 8A. The reason is because the holder member 7 wound on its outer peripheral surface with the resin film 8A is improved in sliding property at a time when it is inserted into the hollow portion of the hollow base body 4, and thereby insertion and assembly of the holder member 7 into the hollow base body 4 can be carried out smoothly.

As seen in the description above, the pressure sensitive sensor 1 of this embodiment employs the structure where, between the hollow base body 4 and the pair of electrically conductive rubbers 6,6, in more detail, between the hollow base body 4 and the holder member 7 including the integrally formed electrically conductive rubbers 6,6, the plasticizer blocking layer 8 made of the resin material having a different SP value from that of the plasticizer blended in the hollow base body 4 is provided.

Such a plasticizer blocking layer 8 can prevent the plasticizer in the hollow base body 4 from permeating in and immigrating to the electrically conductive rubbers 6,6 which are considered to be a main cause of the electrical conductive failure of the pair of electrically conductive rubbers 6,6 occurring when the pressure sensitive sensor 1 is applied with the heating load.

Thus, the prevention of swelling of the electrically conductive rubbers 6,6 can effectively be avoided to prevent increase in the electrical resistance effectively, so that the detection sensitivity of the pressure sensitive sensor 1 can be maintained excellently for a long period of time.

Also, in this embodiment, since the pressure sensitive sensor 1 is structured such that the pair of electrically conductive rubbers 6,6 are formed integrally with the holder member 7 in the hollow portion of the holder member 7 which is a member separated from the hollow base body 4 and the holder member 7 is inserted into the hollow portion of the hollow base body 4, the pressure sensitive sensor 1 can be easily manufactured, which results in cost merit.

In addition, since the plasticizer blocking layer 8 is constructed by winding the resin film 8A made of the resin material having the different SP value from that of the plasticizer in the hollow base body 4 around the outer surface of the holder member 7, the convenient construction is achieved and, moreover, the multi-layers winding of the resin film 8A carried out around the outer surface of the holder member 7 can block the permeation and immigration of the plasticizer of the hollow base body 4 to the electrically conductive rubbers 6,6 in a multi-stages manner to surely avoid the electrically conductive rubbers 6,6 from swelling. The plasticizer blocking layer 8 of a single layer is of course acceptable when a required thickness of the layer or the like is achieved.

And, the electrically conductive rubbers 6,6 alternatively accept an electrically conductive metallic thin plate used for one of them or the rubbers provided with electrically conductive metallic wires buried therein to enhance conductivity, as well the ones made of electrically conductive rubber only, which are used in this embodiment.

Also, instead of the way of the extrusion molding where the electrically conductive rubbers 6,6 are formed integrally with the holder member 7 along with its inner surface in this embodiment, it is possible to mold the hollow base body 4, the electrically conductive rubbers 6,6 and the plasticizer blocking layer 8 all together so as to eliminate the holder member 7.

This embodiment describes the pressure sensitive sensor 1 applied to the power window of the rear side door of the automobile as a device to prevent a foreign matter from being caught in between the window glass and the glass run. The scope of the present invention however is not limited to such an application only, and includes an application to a front door, a residential shutter, a resilient bumper of a transportation cart or the like as needed.

Next, the pressure sensitive sensor 1 in accordance with the present invention is hereinafter described in more detail using examples.

EXPERIMENTAL EXAMPLES

Sample 1

Sample 1 with respect to the pressure sensitive sensor, which includes no plasticizer blocking layer 8, was made first by extrusion molding a silicone rubber material mixed with carbon particles (SP value 7.3) to make a pair of electrically conductive rubbers 6,6 and silicone rubber material (SP value 7.3) to make the hollow holder member 7 integrally with each other. Here, the electrically conductive rubbers 6,6 were disposed so as to be opposite to each other with a required distance away from each other. And then by directly inserting this holder member 7 into the hollow base body 4 of the glass run 3 made of EPDM (having SP value 7 to 8 of the plasticizer), Sample 1 was finally obtained.

Sample 2

Sample 2 with respect to the pressure sensitive sensor, which includes plasticizer blocking layer 8 between the hollow base body 4 and the holder member 7, was obtained in the same quantity as that of Sample 1 by preparing the hollow holder member 7 containing therein a pair of electrically conductive rubbers 6,6 integrally formed in the same manner as in Sample 1 and the glass run 3 including the same hollow base body 4 as in Sample 1, and then by inserting the holder member 7 provided with the vinylidene chloride film 8A having SP value of 9.8 (available from Asahi Kasei Co. Ltd., commercial name is SALAN WRAP) wound in double layers around the outer surface of the holder member 7 into the hollow base body 4. This structure is illustrated in detail in FIG. 4.

Such Samples 1 and 2 obtained by the method described above are respectively put in an endurance test imparting heat (100° C. by 680 hours), which is equivalent to that applied during a long lasting use of an automobile under a domestic condition in Japan.

The test results regarding Sample 1, which has no plasticizer blocking layer 8, showed that the electrical resistance of the pair of electrically conductive rubbers 6,6 drastically changed from the initial values between 700 and 800 Ω to the consequent values between 4000 and 5000 Ω, resulting in occurrence of an electrical connection failure.

On the contrary, the test results regarding Sample 2, which has the plasticizer blocking layer 8, showed that the electrical resistances of the pair of electrically conductive rubbers 6,6 were between 700 and 800 Ω. This suggests that the consequent values do not substantially change from the initial values between 700 and 800 Ω.

Further, observation of the surface of each resin film 8A comprising the plasticizer blocking layer 8 of Sample 2 with electronic microscope by magnification of 185 times after the endurance test revealed adhesives on the surfaces of both the first and second layers. These adhesives could be flushed out with n-hexane liquid, and therefore it can be considered that the plasticizer was eluded from EPDM of the hollow base body 4. Here, there was differences in an extent of the deterioration between the first and second layers. The extent of deterioration of the first layer was more noticeable than the second one. That is, such deterioration of the first layer was estimated to be caused by micro clacks. On the other hand, no micro cracks was found as to the second layer. This shows that the blocking of the permeation and immigration of the plasticizer of the hollow base body 4 to the surface of the holder member 7 can surely be effected.

From the results of the endurance test above described, it is understood that the plasticizer blocking layer 8, which is made of the resin material having different SP value from that of the plasticizer of the hollow base body 4 and disposed between the hollow base body 4 and the hollow holder member 7 containing the electrically conductive rubbers 6,6 prevents the plasticizer of the hollow base body 4 from permeating in and immigrating to the electrically conductive rubbers 6,6 when the hollow base body 4 is loaded with heat. Thus, the plasticizer blocking layer 8 can effectively avoid the swelling of the electrically conductive rubbers 6,6 which results in the increase in the electrical resistance due to aging. Therefore, the high sensitivity can be maintained in the pressure sensitivity sensor 1 of Sample 2 for a long time period.

In addition, it is understood that a given thickness of the plasticizer blocking layer 8 achieved by, for example, multi-layer structure can more effectively prevent the plasticizer of the hollow base body 4 from permeating in and immigrating to the electrically conductive rubbers 6,6 when the hollow base body 4 is loaded with heat so as to maintain the high sensitivity of the pressure sensitive sensor 1 for a longer time period.

The entire contents of a Patent Application No. TOKUGANHEI 10-255611, with a filing date of Sep. 9, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A pressure sensitive sensor comprising:
    a hollow base body made by use of a rubber material and having a hollow portion;
    a pair of electrically conductive bodies, at least one of which is made by use of an electrically conductive rubber material, disposed so as to be opposed to each other with a predetermined distance in the hollow portion of the hollow base body; and
    a plasticizer blocking layer which is provided between the hollow base body and the pair of electrically conductive bodies and which is made by use of a resin material having a different solubility parameter from that of a plasticizer in the hollow base body,
    wherein the pressure sensitive sensor becomes electrically conductive when the pair of the electrically conductive bodies come in contact with each other.

2. A pressure sensitive sensor according to claim 1, wherein the pair of electrically conductive bodies are formed integrally with a holder member within a hollow portion of the holder member made of the same material as a rubber main material of the conductive rubber material.

3. A pressure sensitive sensor according to claim 2, wherein the holder member is inserted into the hollow portion of the hollow base body.

4. A pressure sensitive sensor according to claim 2, wherein the plasticizer blocking layer is a film-like member covering an outer peripheral surface of the holder member.

5. A pressure sensitive sensor according to claim 4, wherein the film-like member is wound around the outer peripheral surface of the holder member in multi-layers.

6. A pressure sensitive sensor according to claim 2, wherein a friction coefficient of the plasticizer blocking layer is smaller than that of the holder member.

7. A pressure sensitive sensor according to claim 1, wherein one of the pair of electrically conductive bodies is made of metal.

8. A pressure sensitive sensor according to claim 1, wherein the pair of electrically conductive bodies is provided with electrically conductive metal wires buried in the conducive rubber material.

9. A pressure sensitive sensor according to claim 1, wherein said hollow base body is formed by use of ethylene-propylene copolymer.

10. A pressure sensitive sensor according to claim 1, wherein the plasticizer blocking layer is formed by use of one material selected from the group of polytetraphroloethylene, polystyrene, vinylidene chloride, polyvinyl chloride, polyurethane, and polyester.

11. A pressure sensitive sensor according to claim 1, wherein the plasticizer blocking layer is subjected to annealing treatment.

12. A pressure sensitive sensor comprising:
    a hollow base body made by use of a rubber material and having a hollow portion;
    a pair of electrically conductive bodies, at least one of which is made by use of an electrically conductive rubber material, disposed so as to be opposed to each other with a predetermined distance in the hollow portion of the hollow base body; and
    plasticizer blocking means disposed between the hollow base body and the pair of electrically conductive bodies, for blocking a plasticizer in the hollow base body from immigrating to the pair of electrically conductive bodies,
    wherein the pressure sensitive sensor becomes electrically conductive when the pair of electrically conductive bodies come in contact with each other.

13. A method for manufacturing a pressure sensitive sensor comprising:
    preparing a hollow base body made by use of a rubber material and having a hollow portion;
    disposing a pair of electrically conductive bodies, at least one of which is made by use of a conductive rubber material, so as to be opposed to each other with a predetermined distance in the hollow portion of the hollow base body; and
    providing a plasticizer blocking layer, made by use of a resin material having a different solubility parameter from that of a plasticizer in the hollow base body, between the hollow base body and the pair of electrically conductive bodies.

14. A method for manufacturing a pressure sensitive sensor according to claim 13, wherein the pair of electrically conductive bodies are formed integrally with a holder member within a hollow portion of the holder member made by use of the same material as a rubber main material of the conductive rubber material.

* * * * *